United States Patent [19]

Hodges, Jr. et al.

[11] Patent Number: 4,578,947

[45] Date of Patent: Apr. 1, 1986

[54] SINGLE CAST ROD-IN-TUBE SOLID PROPELLANT ROCKET MOTOR GRAIN WITH A TORISPHERICAL DOME

[75] Inventors: James C. Hodges, Jr.; Stephen E. Hecht, both of Huntsville, Ala.

[73] Assignee: The United States of America as represented by the Secretary of the Army, Washington, D.C.

[21] Appl. No.: 685,358

[22] Filed: Dec. 24, 1984

[51] Int. Cl.$^4$ ............................ F02K 9/00; F02K 9/70
[52] U.S. Cl. ...................................... 60/253; 60/39.47
[58] Field of Search ...................... 60/253, 255, 39.47; 102/291, 287, 288, 289, 291, 292

[56] References Cited

U.S. PATENT DOCUMENTS

| | | | |
|---|---|---|---|
| 2,988,877 | 6/1961 | Shope | 102/287 |
| 3,033,117 | 5/1962 | Bonner | 60/253 |
| 3,073,242 | 1/1963 | Hewson | 102/287 |
| 3,256,819 | 6/1966 | Leeper | 60/253 |
| 3,332,243 | 7/1967 | Wilson | 60/253 |
| 3,427,809 | 2/1969 | Lavoie | 60/253 |
| 3,718,095 | 2/1973 | Munger et al. | 102/287 |
| 3,807,171 | 4/1974 | Anderson | 60/255 |

OTHER PUBLICATIONS

Corley, B. M., "Solid Propellant Gas Generators", Space-Aeronautics, Oct. 1961, pp. 72-76.
AMCP 706-282, "Ballistic Missile Series Propulsion and Propellants", Aug. 1963, pp. 23-24.

Primary Examiner—Louis J. Casaregola
Assistant Examiner—Timothy S. Thorpe
Attorney, Agent, or Firm—Anthony T. Lane; Robert P. Gibson; Jack W. Voigt

[57] ABSTRACT

A single cast solid propellant rocket motor grain having a centrally positioned rod portion integrally connected to an outer cylindrical portion at a base portion and comprised of a unitary solid propellant rocket motor grain wherein the central rod portion is approximately twice the thickness of an outer cylindrical portion and having the geometric dimensions and shape to achieve substantially a simultaneous burnout of the propellant burning surfaces after maintaining a burning neutrality from ignition to completion of propellant burning.

3 Claims, 4 Drawing Figures

SINGLE CAST ROD-IN-TUBE SOLID PROPELLANT ROCKET MOTOR GRAIN WITH A TORISPHERICAL DOME

DEDICATORY CLAUSE

The invention described herein may be manufactured, used, and licensed by or for the Government for governmental purposes without the payment to us of any royalties thereon.

BACKGROUND OF THE INVENTION

A conventional rod-in-tube (R-I-T) solid propellant grain design requires two casting operations, one for the rod portion of the propellant grain and one for the tube portion of the propellant grain. A mechanical support device is also required for the rod portion of the grain. The mechanical support device increases the rocket motor weight; however, regardless of the extra weight burden the R-I-T solid propellant grain design provides burning neutrality desirable for some opeations; therefore, it is a necessary burden to the system using it.

The elimination of extra weight of a non-contributing member for propulsion would be advantageous, particularly, if the burning neutrality can be retained.

Therefore, an object of this invention is to provide a Single Cast Rod-In-Tube (SCRIT) solid propellant rocket motor grain.

A further object of this invention is to provide a solid propellant rocket motor grain having a unique design that reduces the production time and cost while maintaining the symmetry, simpicity and burning neutrality of the conventional rod-in-tube (R-I-T) grain design.

Still a further object of this invention is to achieve a reduced rocket motor weight because of the design that does not require a mechanical support device for the rod portion of the grain.

SUMMARY OF THE INVENTION

In accordance with this invention, a single cast rod-in-tube solid propellant rocket motor grain produces a burning neutrality and produces a minimum propellant sliver at propellant burn out. The design is unique in that it reduces the production time and cost while maintaining the symmetry and simplicity of a conventional rod-in-tube (R-I-T) while achieving a substantial rocket motor weight reduction since the design does not require a mechanical support device for the rod portion of the grain.

DESCRIPTION OF THE PREFERRED EMBODIMENT

Figure 1:
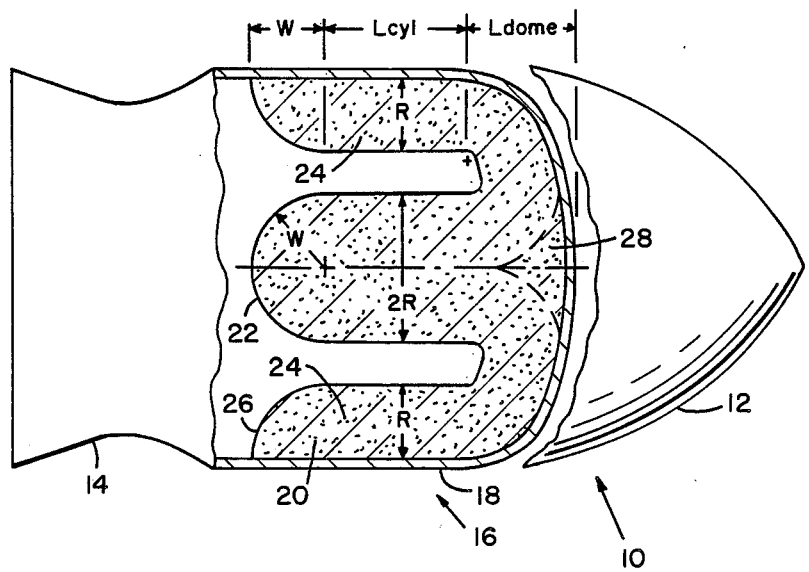
FIG. 1 is a single cast rod-in-tube, round end solid propellant grain.
Figure 4:
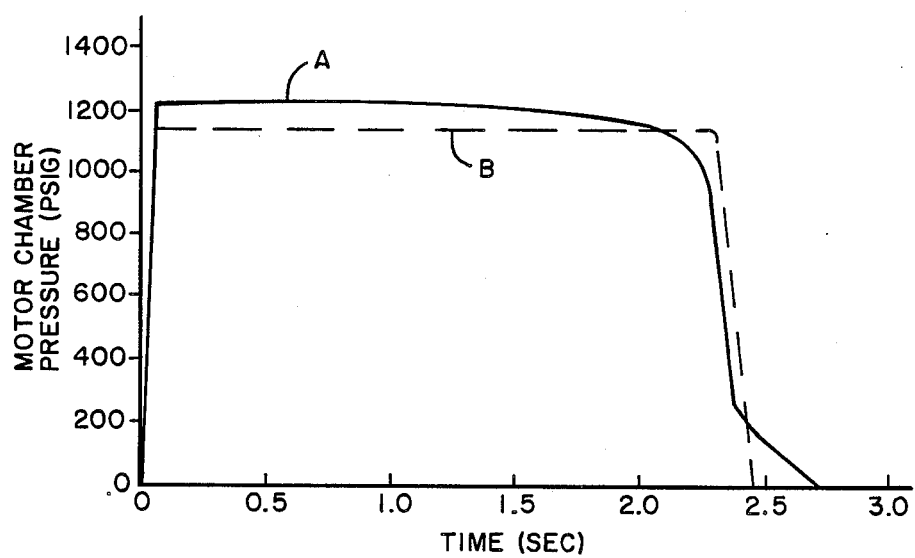
FIG. 4 is a static test pressure vs time curve depicting an actual neutral burning curve A compared with a predicted neutral burning curve B.

Referring now to FIG. 1, rocket 10 is illustrated that has a forward nose cone portion 12 and a rear nozzle section 14. Between nose cone sections 12 and 14, there is a rocket motor section 16. Rocket motor section 16 contains a rocket motor case 18 with a single cast rod-in-tube round end solid propellant grain 20 contained within the rocket motor case. The solid propellant grain 20 has a rod portion 22 having a thickness of 2R which is a portion of the single cast-rod-tube, round end solid propellant grain additionally including a web portion 24 having a thickness of R in a cylindrical shape that has a tapered portion 26 having a radius of curvature W which is equal to R and which terminates at the rear section of rocket motor case 18. Solid propellant grain 22 has a length subdivided diagrammetically into L dome, L cyclinder, and W length sections as shown in FIG. 1. Solid propellant grain 22 is ignited by a conventional igniter (not shown) to produce a neutral burning curve A as shown in FIG. 4.

Figure 2:
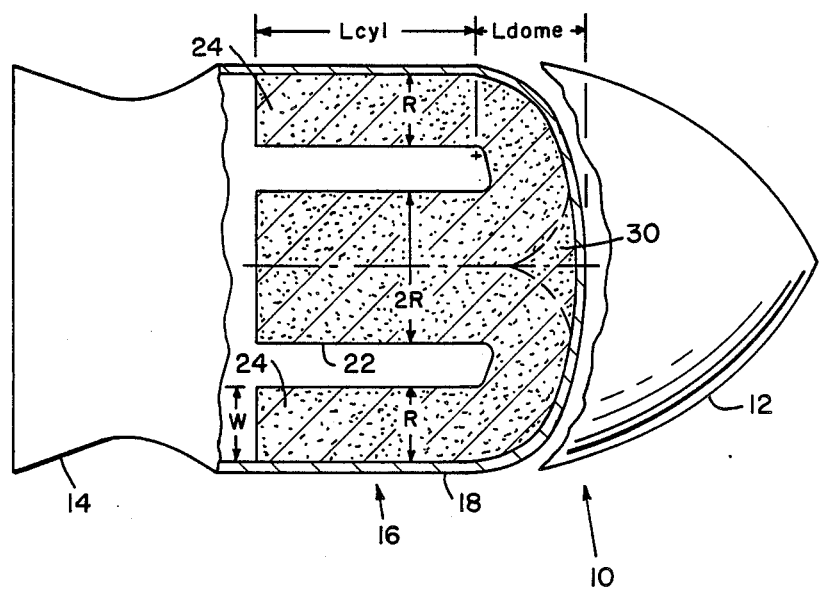
FIG. 2 is a single cast rod-in-tube, flat end solid propellant grain.

FIG. 2 illustrates another embodiment which is a single cast rod-in-tube, flat end solid propellant grain having like numerals assigned to like parts as shown in FIG. 1 except that the flat end solid propellant grain is designated 26, and it has a length subdivided diagrammatically in an L dome section and an L cylinder section.

Figure 3:
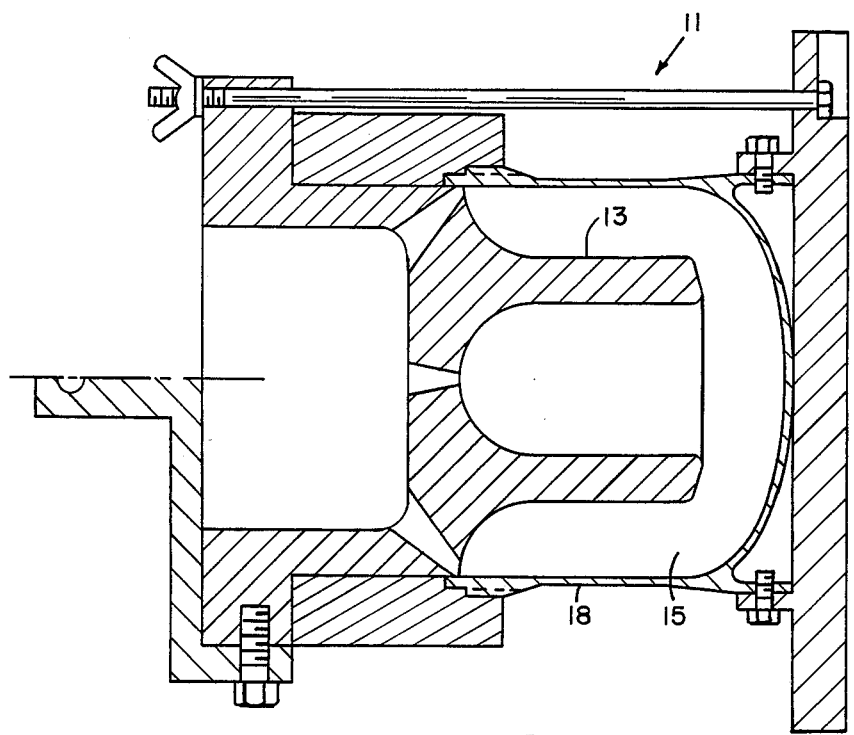
FIG. 3 is a typical casting set-up to produce a single cast rod-in-tube round end solid propellant grain.

FIG. 3 illustrates a typical casting set-up 11 illustrating a mandrel 13 in position for forming a single cast rod-in-tube round end solid propellant grain in the grain mold cavity 15 defined by mandrel 13 and case 18.

Solid propellant formulation of grains 20 and 26 is a castable, curable type having a binder which is composed of functionally terminated polybutadienes such as carboxy terminated polybutadiene, hydroxy terminated polybutadiene, nitrocellulose, or other double base ingredients, and etc. The propellant composition also contains an oxidizer such as ammonium perchlorate or an organic oxidizer, energetic plasticizer compounds, a fuel such as aluminum, burning rate additives, a cross-linking agent and other additives such as processing aids as desired.

The grain 20 and 26 are proportioned in volume to achieve a neutral burning pressure vs time curve with the substantially simultaneous completion of web portion 24 burning time and rod portion 22 burning time which results in a sharp tail off in burning curve as shown in FIG. 4. In an actual test firing based on 4.29 pounds of propellant loaded 4.17 pounds of propellant burned to give a sliver weight of only 0.12 pounds. The sliver portions are designated as 28 and 30 in FIGS. 1 and 2 respectively.

FIG. 4 depicts a verification of the design features of the grain of FIG. 1. The actual burning curve represents an actual grain design that was static tested. The grain calculation was based on the following inputs set forth in Table I below.

TABLE I

| Designation | Abbreviation | Value/Units |
| --- | --- | --- |
| Total specific impulse | I TOT = | 880 lb-sec |
| Burning time | $T_b =$ | 2.3 sec |
| Grain outside diameter | GRN OD = | 5.211 in |
| Propellant pressure exponent | PROP n = | 0.387 |
| Propellant burn rate constant | PROP a = | 0.027 |
| Propellant characteristic exhaust velocity | PROP C* = | 5000 ft/sec |
| Delivered specific impulse | DEL ISP = | 212 lb-sec/lb |
| Burning rate | BRN RATE = | 0.4304 in/sec |
| Propellant ratio area of burning surface (sq in) motor nozzle throat area (sq in) | PROP Kn = | 292.491 |
| Round end | RND END | YES |

Table II set forth hereinbelow contains other test data derived from a static test to which the pressure-time curve of FIG. 4 relates.

TABLE II

TEST DATA

| | |
|---|---|
| Average thrust | 366 lb$_f$ |
| Total impulse | 891 lb$_f$-sec |
| Prop weight burned | 4.17 lb |
| Prop weight loaded | 4.29 lb |
| Sliver weight | 0.12 lb |
| Del ISP | 214 lb-sec/lb |

Avg $P_c \Phi \rightarrow 2.3$ sec 1149 psi

A comparison of the predicted data and the measured data indicates the usefulness of the SCRIT design program. The predicted average chamber from 0 to 2.3 seconds was 1140 psi and the measured average chamber pressure from 0 to 2.3 seconds was 1149 psi, a difference of only 0.8%. For those applications where a length/diameter ratio is near one, this grain offers many design advantages.

We claim:

1. A single cast solid propellant rocket motor grain comprising a centrally positioned rod portion integrally connected to an outer cylindrical portion at a base portion, said rod portion, said cylindrical portion, and said base portion forming a unitary solid propellant rocket motor grain, said cylindrical portion having a propellant web thickness of approximately one half of the thickness of said centrally positioned rod portion to thereby achieve a substantially simultaneous burn-out of the propellant burning surfaces of said single cast solid propellant rocket motor grain comprised of said rod portion, said cylindrical portion, and said base portion in the form of said unitary solid propellant rocket motor grain characterized by having a burning neutrality as determined by static test pressure versus time curve determination and evaluation.

2. A single cast solid propellant rocket motor grain as defined in claim 1 wherein said centrally positioned rod portion has an exposed round end surface and wherein said cylindrical portion has an exposed end surface having a curved end portion.

3. The single cast solid propellant rocket motor grain as defined in claim 1 wherein said centrally positioned rod portion has an exposed flat end surface and wherein said cylindrical portion has an exposed flat end surface.

* * * * *